Sept. 22, 1925.                                                    1,554,487
J. BERG
VALVE STEM LOCK FOR AUTOMOBILE CASINGS
Filed Sept. 20, 1924
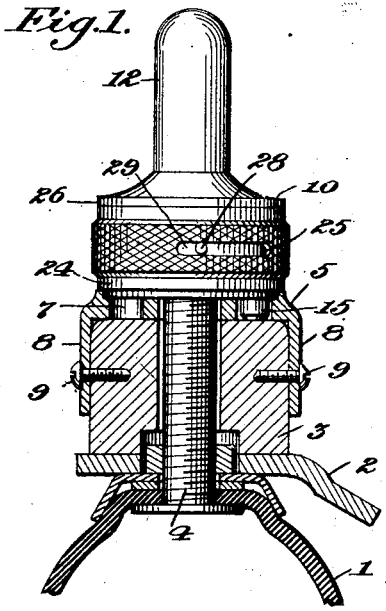
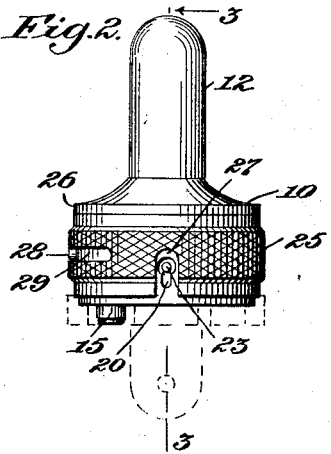
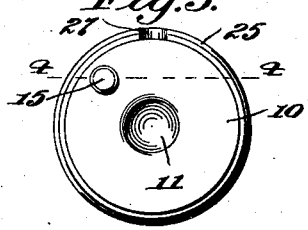
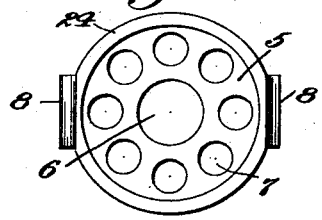
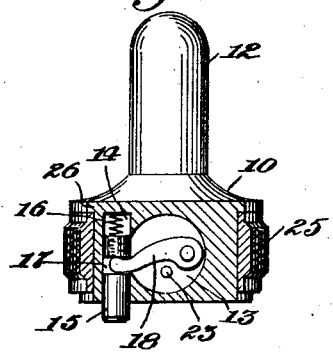
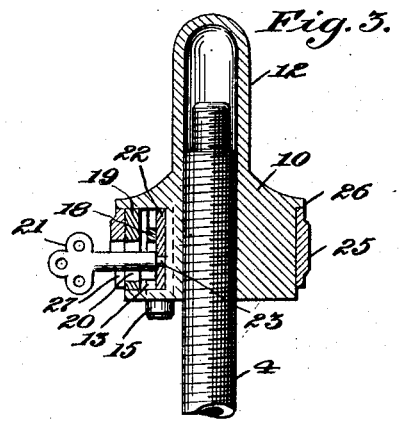
Inventor:
Joseph Berg
By Riordan & Riordan
Att'ys.

Patented Sept. 22, 1925.

1,554,487

UNITED STATES PATENT OFFICE.

JOSEPH BERG, OF LITTLE ROCK, ARKANSAS.

VALVE-STEM LOCK FOR AUTOMOBILE CASINGS.

Application filed September 20, 1924. Serial No. 738,823.

*To all whom it may concern:*

Be it known that I, JOSEPH BERG, of Little Rock, in the county of Pulaski and State of Arkansas, a citizen of the United States, have invented certain new and useful Improvements in Valve-Stem Locks for Automobile Casings, of which the following is a specification.

This invention is a tire lock and has for its object the provision of a simple and inexpensive device which may be easily fitted about the stem of an inflation valve and locked to the felly through which the stem passes, to prevent access to the stem for deflating the tire by unauthorized persons.

Another object is to provide means whereby the lock will be guarded against the choking effect of mud or accumulated dust, and efforts to use a wrench for removing the lock will be fruitless.

The invention is illustrated in the accompanying drawing and will be hereinafter fully described, the novel features being particularly pointed out in the appended claims.

In the drawing, Fig. 1 is a view, partly in elevation and partly in section, of the lock applied.

Fig. 2 is an elevation of the lock removed and viewed at a right angle to Fig. 1, Fig. 3 is a section on the line 3—3 of Fig. 2, Fig. 4 is a section on the line 4—4 of Fig. 5, Fig. 5 is a bottom plan view of the lock, Fig. 6 is a top plan view of the washer or keeper plate with which the bolt of the lock engages.

The reference numeral 1 indicates a portion of the inner tube of a pneumatic tire, 2 a portion of the tire-supporting rim, 3 the wheel felly, and 4 the threaded stem of an inflation valve which is secured in the inner tube and passes through the rim and the felly in the usual manner.

In carrying out my invention, I secure upon the inner circumference of the felly a washer or keeper plate 5 which is provided with a central opening 6 for the passage of the valve stem 4 and also with an annular series of openings 7 arranged concentric with the opening 6 and the lower ends of which are closed by the felly when the device is applied, as shown in Fig. 1. The washer or keeper plate may be secured upon the felly in various ways, and I have illustrated wings 8 integral with the washer and depending from diametrically opposite points thereof to fit against the sides of the felly, screws 9 being inserted through the wings into the felly.

The lock comprises a body 10 having a central bore 11 and a central elongated reduced projecting portion 12 which is closed at its outer end whereby the body may be fitted over the valve stem, as shown most clearly in Figure 3, to completely house the same and constitute a dust cap therefor. The lower end of the body 10 rests upon the washer 5 in contact with the inner face of the latter throughout the area thereof so that the openings 7 in the washer are completely covered. In the side of the body is a recess 13, preferably of circular outline as shown in Fig. 4, and immediately adjacent said recess is a guide passage or socket 14 in which the bolt 15 is slidably mounted, a spring 16 being housed in said socket between the inner end of the same and the top of the bolt and tending constantly to project the bolt through the open lower end of the socket to engage one of the openings 7 in the washer or keeper. A notch 17 is formed in the side of the bolt and is engaged by the free end of a lever or throw-arm 18 which is pivoted at one end in the recess 13 and extends through the same to enter the socket 14, as shown clearly in Fig. 4. The recess 13 opens through the side of the body and a cap 19 is provided to close the same after the lever has been mounted therein, the cap, of course, having a keyhole slot 20 therein to admit an operating key 21. Preferable, a back plate 22 is fitted in the recess and the lever is pivoted upon this back plate which also carries a centering pin 23 to receive and support the inner end of the key. As shown in Figs. 1 and 6, the washer or keeper is provided with an annular flange or rim 24 to fit around the lower end of the body 10, and a guard ring 25 encircles the body between said rim and an annular shoulder 26 on the body. The guard ring is snug but slidable on the body so that it may be shifted circumferentially to cover the keyhole slot 20, or to bring the notch 27 in the guard into alinement therewith, the circumferential movement of the guard being limited by a stud 28 on the body engaging the end walls of a slot 29 formed in and extending circumferentially of the guard.

The use of the device will, it is thought, be readily understood. The bore of the lock body 10 is preferably threaded so that it may be engaged with the stem 4 in such a manner that it cannot be lifted therefrom. When the body is turned home on the stem against the keeper, the end of the bolt will enter one of the sockets or openings 7 therein, as shown in Fig. 1, and reverse rotation cannot be then imparted to the body until the bolt is retracted by the use of the key which, of course, is in the possession of the owner or person in charge of the car. After the body is turned home and is locked to the felly, the guard is shifted so that it will cover the keyhole slot 20 and thereby protect the same from mud as well as conceal its location. Should a wrench or other tool be applied to the guard in an effort to turn the lock from the felly, the pin or stud 28 will be snapped off and the guard will then turn loosely around the body without imparting any movement thereto. It will be readily noted that I have provided a very simple and compact device which will effectually lock tires to the wheels of automobiles to prevent their theft. The device is not locked to the valve stem so that it may be applied to any valve stem without requiring any change therein and it may be applied to any known make of automobile wheel by merely providing a keeper plate of the proper size. The device is small and neat, will add to rather than detract from the appearance of the wheel, and the dust cap cannot be twisted off.

Having thus fuly described my invention, what I claim as new and desire to secure by Letters Patent of the United States is:—

1. The combination with a felly, and a tire valve stem passing through the felly, of a keeper secured on the felly, a body enclosing the stem and resting on the keeper, a lock set in the side of the body and co-operating with the keeper, and a guard mounted on the body and turnable thereon to pass over and conceal the lock.

2. The combination with a felly, and a tire valve stem passing through the felly, of a keeper secured on the felly, a body resting on the keeper and enclosing the valve stem, a key-controlled lock mounted in the body to engage the keeper, the keeper having a rim engaging around the lower end of the body and the body having an annular shoulder above its lower end, a guard fitted on the body between said rim and said shoulder and slidable circumferentially upon the body, and means for limiting the movement of the guard.

3. The combination with a felly, and a tire valve stem passing through the felly, of a keeper secured on the felly around the stem and having a plurality of sockets concentric with the stem, a body enclosing the stem and resting against the keeper, a bolt mounted in the body and projecting therefrom to engage one of the sockets in the keeper, means for yieldably holding the bolt projected, and a key-controlled lever mounted in the body and engaged with the bolt to retract the same.

In testimony whereof I hereunto affix my signature.

JOSEPH BERG.